United States Patent Office 3,700,600
Patented Oct. 24, 1972

3,700,600
PROCESS OF PREPARING PULVERULENT TO GRANULAR PERBORATE CONTAINING WASHING COMPOSITIONS
Horstmar Nagel, Hilden, Markus Berg, Dusseldorf-Holthausen, Albrecht Lohr, Hosel, and Wilfried Adler, Hilden, Germany, assignors to Henkel & Cie GmbH, Dusseldorf-Holthausen, Germany
No Drawing. Filed Oct. 8, 1970, Ser. No. 79,353
Claims priority, application Germany, Oct. 12, 1969, P 19 51 556.1; Dec. 20, 1969, P 19 63 898.3
Int. Cl. C11d 7/18, 7/56
U.S. Cl. 252—99          8 Claims

ABSTRACT OF THE DISCLOSURE

Pulverulent to granular, perborate containing washing composition comprising (a) From 5% to 40% by weight of anionic, and optionally amphoteric and non-ionic surface-active compounds with the proviso that any non-ionic surface-active compound present does not constitute more than 50% by weight of the total amount of surface-active compounds, (b) From 7.5% to 50% by weight of a perborate whose water of crystallization is below that of a perborate tetrahydrate, (c) From 15% to 80% by weight of compounds capable of complexing calcium ions and, optionally other alkaline builders, (d) From 0 to 10% by weight of non-washactive compounds selected from the group consisting of neutral inorganic compounds and water, and (e) From 0 to 10% by weight of other customary washing composition additives, said composition being a mixture of at least two pulverulent components comprising (A) a pulverulent component comprising (1) said anionic and any amphoteric and non-ionic surface-active compounds, (2) optionally present non-hydrolysable complex-formers, (3) not more than 20% by weight of hydrolysable complex-formers, and (4) other customary washing composition additives utilized in small amounts, said pulverulent component being prepared by drying with heat an aqueous suspension or slurry of the said components, (B) said perborate component, and (C) a pulverulent component comprising the remainder of the hydrolysable complex-formers and alkaline builders, if any. The process of producing the washing composition is also part of the invention.

THE PRIOR ART

Within the last twenty years the composition of the washing compositions placed on the market has been so much improved that the concentrations of the washing composition recommended by the manufacturer to be used, may be considerably reduced. While 20 to 15 years ago, concentrations of about 10 gm. per liter of the washing composition were still considered as normal use, today concentrations of 6 to 3 gm. of washing composition per liter are sufficient for most soiled and dirty materials occurring in practice.

OBJECTS OF THE INVENTION

An object of the present invention is the development of a pulverulent to granular, perborate containing washing composition which is readily active in low concentrations.

Another object of the present invention is the development of a pulverulent to granular, perborate containing washing composition consisting essentially of (a) from 5% to 40% by weight of surface-active compounds selected from the group consisting of anionic surface-active compounds, amphoteric surface-active compounds and non-ionic surface-active compounds, with the proviso that at least 50% by weight of the surface-active compounds are anionic surface-active compounds, (b) from 7.5% to 50% by weight of an alkali metal perborate whose water of crystallization is below that of a perborate tetrahydrate, (c) from 15% to 80% by weight of complex-forming compounds capable of complexing calcium ions and inorganic alkaline builders with the proviso that said inorganic alkaline builders are present in an amount of from 0 to 50% by weight of component C, (d) from 0 to 10% by weight of non-washactive compounds selected from the group consisting of neutral inorganic non-builder compounds and water, and (e) from 0 to 10% by weight of other customary washing composition additives, said composition being a mixture of at least two pulverulent components consisting essentially of (A) a component composition consisting essentially of (1) said surface-active compounds, (2) optionally present non-hydrolysable complex-forming compounds, (3) not more than 20% by weight of hydrolysable complex-forming compounds and (4) said other customary washing composition additives, said component composition being prepared by drying with heat an aqueous suspension or slurry of said components, (B) said perborate component, and (C) a component composition consisting essentially of the remainder of hydrolysable complex-forming compounds and inorganic alkaline builders, if any.

A further object of the invention is the development of a process for the production of said pulverulent to granular, perborate containing washing compositions.

These and other objects of the invention will become more apparent as the description thereof proceeds.

DESCRIPTION OF THE INVENTION

The present invention therefore provides a pulverulent to granular washing composition comprising:

(a) 5% to 40%, preferably 7% to 35%, by weight of anionic and, optionally, amphoteric and/or non-ionic surface-active compounds, while any non-ionic surface-active compounds present constitute not more than 50%, preferably 35%, by weight of the total surface-active compounds present, (b) 7.5% to 50%, preferably 15% to 30%, by weight of a perborate, the content of water of crystallization of which lies below that of the perborate tetrahydrate, (c) 15% to 80%, preferably 25% to 70%, by weight of complex-forming compounds capable of forming a complex with calcium ions, and, optionally other alkaline reacting inorganic builders, (d) 0 to 10%, preferably 1% to 5% of non-washactive compounds selected from the group consisting of neutral inorganic compounds such as sodium sulfate and/or sodium chloride and/or bound water, including the water of hydration or crystallization present in the above-mentioned components, and (e) 0 to 10%, preferably 1% to 5% of other customary washing composition additives such as dirt carriers, brighteners, corrosion inhibitors, non-surface-active foam inhibitors, antimicrobial additives and enzymes, said composition being a mixture of at least two powder or pulverulent components of the following nature:

(A) A powder component, comprising said anionic, and any amphoteric and/or non-ionic surface-active compounds, as well as the optionally present non-hydrolysable complex-forming substances, but not more than 20%, preferably not more than 10%, by weight of hydrolysable complex-forming substances, such as metaphosphates and especially tripolyphosphates, said powder component being prepared by drying with heat an aqueous suspension or slurry of the said components, (B) The perborate containing a minor amount of water, and (C) Possibly the other washing composition additives, particularly the remainder of the hydrolysable complex-forming substances, especially the tripolyphosphate.

The term "powder component" used above was used for reasons of simplification and is not intended to refer to the size of grain of these components; therefore, all these components may be fine or coarse powders, granulates or agglomerates.

Broadly, the present invention provides a pulverulent to granular, perborate containing washing composition which is readily active in low concentrations.

Another object of the present invention is the development of a pulverulent to granular, perborate containing washing composition consisting essentially of (a) from 5% to 40% by weight of surface-active compounds selected from the group consisting of anionic surface-active compounds, amphoteric surface-active compounds and nonionic surface-active compounds, with the proviso that at least 50% by weight of the surface-active compounds are anionic surface-active compounds, (b) from 7.5% to 50% by weight of an alkali metal perborate whose water of crystallization is below that of a perborate tetrahydrate, (c) from 15% to 80% by weight of complex-forming compounds capable of complexing calcium ions and inorganic alkaline builders with the proviso that said inorganic alkaline builders are present in an amount of from 0 to 50% by weight of component C, (d) from 0 to 10% by weight of non-washactive compounds selected from the group consisting of neutral inorganic non-builder compounds and water, and (e) from 0 to 10% by weight of other customary washing composition additives, said composition being a mixture of at least two pulverulent components consisting essentially of (A) a component composition consisting essentially of (1) said surface-active compounds, (2) non-hydrolysable complex-forming compounds, (3) not more than 20% by weight of hydrolysable complex-forming compounds and (4) said other customary washing composition additives, said component composition being prepared by drying with heat an aqueous suspension or slurry of said components, (B) said perborate component, and (C) a component composition consisting essentially of the remainder of hydrolysable complex-forming compounds and inorganic alkaline builders, if any.

The powder component A has preferably the following composition:

15% to 99%, preferably 20% to 70%, by weight of surface-active compounds (as above), 1% to 20%, preferably 5% to 15%, by weight of non-washactive components, 0 to 84%, preferably 20% to 76.5%, by weight of other customary components of dried-by-heat washing compositions, including possibly present hydrolysable complex-forming substances (preferably tripolyphosphate, possibly also others, for example metaphosphates) in amounts not more than 20, preferably not more than 10% by weight.

The bound water, the sodium sulfate and the sodium chloride, components which are to be regarded as non-washactive components in a boiling washing composition, are principally introduced into the washing composition by way of the powder component A. Therefore, the content of non-washactive components in the powder component A and the fraction of the powder component A in the total washing composition must be so related that the limiting values given above for the total washing composition are not to be exceeded. The water content of the powder component A should lie between about 1% to 18%, preferably 1% to 15%, by weight after drying by heat. The amounts of the non-washactive components allowable in the powder component A can therefore vary within a certain range, and the above given highest value of 20% by weight can also be occasionally exceeded provided the amount of the powder component A in the total washing composition is correspondingly low.

The following substances are the other usual components of dried by heat washing compositions; the quantities given relate to the powder component A:

0 to 70% by weight of non-hydrolysable, preferably organic, complex-forming substances.

0 to 50%, preferably 5% to 40%, by weight of inganic alkaline reacting builders which are not capable of forming a complex with calcium ions, 0 to 35%, preferably 1.5% to 28%, by weight of organic neutral salts, water-insoluble stabilizers for per-compounds, dirt carriers, brighteners, etc.

Of special interest are complete washing compositions suitable for washing machines, the foaming power of which is considerably reduced particularly in the temperature range from 60° C. to 100° C., preferably 70° C. to 100° C. This foam suppression is obtained by a combination of the synthetic surface-active substances of the sulfonate and/or sulfate type with soap and in some cases non-ionics and/or addition of non-surface-active foam inhibitors. In order to increase the foaming power at lower temperatures, foam stabilizers may be present at the same time. The surface active component of such washing compositions is frequently composed as follows, but not all the components (especially not the non-ionic and the amphoteric surface-active compounds some of which also act as foam stabilizers and the non-surface-active foam inhibitors) need be present in the powder component A:

8% to 95%, preferably 25% to 75%, by weight of surface-active compounds of the sulfonate and/or sulfate type preferably with 8 to 18 carbon atoms in the hydrophobic residue, 0 to 80%, preferably 10% to 50%, by weight of soap, in which the relative amounts (sulfonate+sulfate) to soap lies in the range of 10:1 to 1:10, preferably 5:1 to 1:2, 0 to 35%, by weight of non-ionic surface-active substances, 0 to 6%, preferably 0.5% to 3%, by weight of foam stabilizers, 0 to 8%, preferably 0.5% to 5%, by weight of non-surface-active foam inhibitors, whereby the foaming power of the surface-active component is either reduced by simultaneous presence of surface-active compounds of the sulfonate and/or sulfate type and foam-inhibiting soaps and/or by the presence of the non-surface-active foam inhibitors.

The powder component A may be comprised practically completely of the anionic and in some cases the non-ionic surface-active compounds. Since, however, some surface-active compounds are lacking in powder properties, it is advisable to improve the powder properties of the powder component A by incorporating therein non-surface-active, non-hygroscopic substances. These include, for example, the sodium sulfate present in many surface-active compounds of the sulfonate or sulfate type. Further, salts of organic, non-surface-active carboxylic acids or sulfonic acids, for example, alkali metal salts of toluenesulfonic acid or sulfocarboxylic acids, are suitable for this purpose. Non-hygroscopic complex-forming substances and/or alkaline builders not capable in practice of forming complexes may also improve the powder properties of the component A. Tripolyphosphate, the amount of which however should not exceed 20%, preferably not over 10% by weight, for reasons to be explained below, is suitable also for this purpose.

Tripolyphosphate and non-hydrolysable organic complex-forming compounds may simultaneously be present in the powder component A. When it is only a question of binding traces of heavy metals present in the aqueous mixture and thus, for example, protecting the brighteners from decomposition during the production process, especially during the drying by heat additions of 0.1% to 10% by weight of an organic complex-forming substance, based on the powder component A, are sufficient. Should the non-hydrolysable complex-forming compound, however, also act as a complex-forming substance or chelate in the washing process, its amount may amount to up to 70% by weight, and preferably lies in the region of 15 to 60% by weight.

Should the washing compositions according to the invention contain non-ionics, these may be introduced into the powder component A, provided they do not adversely effect its powder properties or do so only to an unimportant degree. Since many non-ionics are oily to paste-like substances even in the anhydrous state, it is advisable to incorporate only a part thereof or no non-ionics in the powder component A and to spray the remainder or the whole of the non-ionics respectively on the washing composition or one of its powder constituents.

Amphoteric surface-active substances may be inserted in the powder component A, but they may also be sprayed together with the non-ionics or separately from these on a powder component or on the finished washing composition, especially when they melt at temperatures up to 150° C.

In the amounts given above for the surface-active components, the non-surface-active foam inhibitors are also included, because they act on the surface-active compounds during the washing process. In the preparation of the washing compositions these foam inhibitors are suitably not incorporated in the aqueous mixture of the powder component A to be dried, but are sprayed on one of the powder components or on the whole washing composition. It is desirable, however, not to spray them together with the non-ionic or amphoteric surface-active compounds, but separately from these.

Finally, the washing composition components mostly used only in smaller amounts, such as dirt carriers, brighteners, corrosion inhibitors, are advantageously inserted in the powder component A, while washing composition components present in larger amounts (for example alkaline complex-forming builders and/or non-hydrolysable complex-forming substances) may be present as desired in the powder component A and/or in a further powder component C.

The powder component A is prepared by known processes by drying with heat an aqueous mixture of its components. This is, for example, possible on heated drums; preferably the finely atomized, paste-like mixture is brought into contact with hot air flowing in the same direction or in countercurrent, so that a sprayed or atomized product with the above given water content results.

The preponderant amount of the washing compositions containing tripolyphosphate previously on the market was prepared by spray drying a slurry or suspension of anhydrous tripolyphosphate in an aqueous solution of the surface-active compounds. The hydration of the anhydrous tripolyphosphate thereby gave rise to hexahydrate with absorption of water, the viscosity of the aqueous mixture increases, and thereby becomes more and more difficult to process. Moreover, on drying with heat, a part of the tripolyphosphate hydrolyses to pyro- and ortho-phosphates, i.e. to phosphates which have only small complex-forming properties, or no longer have such properties. Thus, only a part of the tripolyphosphate added is available as a complex-forming substance. This hydrolytic splitting of the tripolyphosphate obviously can also occur during the preparation of the powder component A of the washing composition according to the invention when the aqueous mixture to be sprayed contains tripolyphosphate. Since, however, according to the invention the amount of tripolyphosphate contained in the spray-dried powder component A is limited to not more than 20% and preferably not more than 10% by weight, the by-products formed through tripolyphosphate decomposition represent so small a proportion of the total specified amount that they are practically of no consequence. Quite apart from this, the hydrolytic tripolyphosphate decomposition can be repressed by the incorporation of alkaline-reacting substances, such as for example, small amounts of alkali metal hydroxide liquors, alkali metal carbonates or alkali metal ortho- or meta-silicates.

The washing compositions according to the invention contain as powder component B, the perborate containing little water of hydration, particularly as an alkali metal perborate, preferably the so-called "sodium perborate-monohydrate," the composition of which corresponds to the formula $NaBO_2 \cdot H_2O_2$. This formula is simply to be regarded as a summation formula; it is not to be taken as a statement of the structure of this compound. Of course, the total perborate need not be present in this form of low water content; it is sufficient if the water content of the perborate fraction is lower than that corresponding to the formula $NaBO_2 \cdot H_2O_2 \cdot 2H_2O$, and preferably when it is lower than that corresponding to the formula $NaBO_2 \cdot H_2O_2 \cdot 1H_2O$. It is uncertain whether the last named hydrate stages are actually existent; mixtures of sodium perborate tetrahydrate and sodium perborate monohydrate may also be concerned.

Provided the two powder components A and B do not contain all the substances which are to be incorporated in the washing composition, the remaining substances are introduced as a separate powder component. This applies above all for tripolyphosphate. Other complex-forming substances or alkaline builders practically not acting as complex-forming substances, however, may also be introduced. It may thereby happen that the same substance is present both in the spray-dried powder component A and in the further separate powder component C.

In the case that the further separate powder component C contains hydrolysable complex-forming substances, the invention relates to a further form of such washing compositions, which is characterized in that the particles of the said hydrolysable complex-forming compound are combined with the particles of the powder component A to give agglomerates.

Such washing compositions can be prepared in that, drying the hot spraying of the aqueous mixture of the powder component A in the spraying tower, a dry, hydrolysable, inorganic complex-forming compound, especially tripolyphosphate is dusted in, advantageously so that the spray cone of the aqueous mixture meets with the dusted-in tripolyphosphate. Thus, a large part of the not yet, or only incompletely, dried particles of the aqueous mixture come together with the particles of the dusted-in complex-forming substance, especially tripolyphosphate, to form agglomerates, and the further drying takes place without appreciable decomposition of tripolyphosphate.

If non-ionics are to be incorporated in the washing composition according to the invention, especially non-ionics of oily or paste-like nature, it is advisable to spray these on one of the moving powder components, on a moving mixture of two powder components or on the moving mixture of all three of the powder components, while the non-ionics may also be sprayed on during the admixing of the powder components.

In the same way other washing composition components can also be inserted, especially when they are only present in relatively small amounts. These include, for example, non-surface-active foam inhibitors or antimicrobial additives, at least when they melt on heating at temperatures up to 150° C.

There now follows a list, arranged according to the class of substance, of the different products to be incorporated in the washing compositions according to the invention.

The anionic, amphoteric or non-ionic surface-active compounds contain in the molecule at least one hydrophobic residue mostly containing 8 to 26, preferably 10 to 20 and especially 12 to 18 carbon atoms, and at least one anionic, non-ionic or amphoteric water-solubilizing group. The preferably saturated hydrophobic residue is mostly aliphatic, but possibly also alicyclic in nature. It may be combined directly with the water-solubilizing group or through intermediate members. Suitable intermediate members are, for example, benzene rings, carboxylic acid ester or carbon amide groups, residues of polyhydric alcohols linked in ether- or ester-like form, such as for example, those of ethylene glycol, propylene glycol, glycerine or corresponding polyether residues.

The hydrophobic residue is preferably an aliphatic hydrocarbon residue having 10 to 18, preferably 12 to 18 carbon atoms, but deviations from this preferred range of numbers are possible, depending on the nature of the surface-active compound in question.

Soaps, which are derived from natural or synthetic fatty acids, possibly from resin or naphthenic acids, are utilizable as the anionic detergent substances, especially when these acids have iodine values of not more than 30 and preferably less than 10.

Among the synthetic anionic surface-active compounds, the sulfonates and sulfates possess particular practical importance.

The sulfonates include, for example, the alkylaryl-sulfonates, especially the alkylbenzene-sulfonates, which among others, are obtained from preferably straight chain, aliphatic hydrocarbons having 9 to 15, preferably 10 to 14, carbon atoms, by chlorination and condensation with benzene or from corresponding olefins with terminal or non-terminal double bonds by condensation with benzene, and sulfonation of the alkylbenzenes obtained. Furthermore, aliphatic sulfonates are of interest such as are obtainable, for example, from preferably saturated hydrocarbons containing 8 to 18 and preferably 10 to 16, carbon atoms in the molecule by sulfochlorination with sulfur dioxide and chlorine or sulfoxidation with sulfur dioxide and oxygen and conversion of the products thereby obtained into the sulfonates. Mixtures of alkene sulfonates, hydroxyalkane sulfonates and alkane di-sulfonates are also useful as aliphatic sulfonates, such as are obtained, for example, from $C_8$ to $C_{18}$, preferably $C_{12}$ to $C_{18}$, olefins with terminal or non-terminal double bonds by sulfonation with sulfur dioxide, and acid or alkaline hydrolysis of the sulfonation products. In the aliphatic sulfonates thus prepared, the sulfonate group is frequently attached to a secondary carbon atom. However, sulfonates with a primary, for example, terminal, sulfonate group can also be prepared by reacting terminal olefins with a bisulfite.

The sulfonates to be used according to the invention also include salts, preferably dialkali metal salts of $\alpha$-sulfo-fatty acids as well as esters of $\alpha$-sulfo-fatty acids with mono- or poly-hydric alcohols containing 1 to 4 and preferably 1 to 2 carbon atoms.

Further useful sulfonates are salts of fatty acid esters of hydroxyethanesulfonic acid or dihydroxypropane sulfonic acid, the salts of the fatty alcohol esters of lower aliphatic or aromatic sulfomono- or di-carboxylic acids containing 1 to 8 carbon atoms, alkylglycerylether sulfonates and the salts of the amide-like condensation products of fatty acids or sulfonic acids with aminoethanesulfonic acid.

Surface-active compounds of the sulfate type include fatty alcohol sulfates, especially those derived from coconut fatty alcohols, tallow fatty alcohols or from oleyl alcohol. Sulfonation products of the sulfate type utilizable according to the invention can also be prepared from $C_8$ to $C_{18}$ olefins with terminal or non-terminal double bonds. In addition, belonging to this group of surface-active compounds are sulfated fatty acid alkylolamides, sulfated monoglycerides and sulfated products of ethoxylated and/or propoxylated compounds such as fatty alcohols, alkylphenols with 8 to 15 carbon atoms in the alkyl residue, fatty acid amides, fatty acid alkylolamides and so forth, where 0.5 to 20, preferably 1 to 8, and advantageously 2 to 4 mol of ethylene and/or propylene oxide are added to one mol of said compounds to be ethoxylated and/or propoxylated.

The washing agents according to the invention may also contain surface-active synthetic carboxylates, for example, the fatty acid esters or fatty alcohol ethers of hydroxycarboxylic acids as well as the fatty acid amide condensation products of fatty acids or sulfonic acids with aminocarboxylic acids, for example, glycocoll, sarcosine or protein hydrolysates.

Products which owe their solubility in water to the presence of polyether chains, amineoxide, sulfoxide or phosphineoxide groups, alkylolamide groups, and very generally to a number of hydroxyl groups, belong to the non-ionic surface-active compounds, denoted here as "Non-ionics" for the sake of simplicity.

The products obtainable by addition of ethylene oxide and/or glycide to fatty alcohols, alkylphenols, fatty acids, fatty amines, fatty acid amides and sulfonic acid amides are of special practical interest. These "Non-ionics" may contain, per molecule, 4 to 100, preferably 6 to 40 and especially 8 to 20, ether residues above all ethylene glycol ether residues. Moreover, propylene or butylene glycol ether residues may be present either in these polyglycol ether residues or at their ends.

Further, products known by the trade names of "Pluronics" and "Tetronics" belong to the "Non-ionics." They are obtained from water-insoluble polypropylene glycols or from water-insoluble propoxylated lower aliphatic alcohols containing 1 to 8, preferably 3 to 6 carbon atoms and/or from water-insoluble propoxylated alkylenediamines. These water-insoluble (for example, hydrophobic) propylene oxide derivatives are converted into the said "Non-ionics" by ethoxylation until they become soluble in water. Finally, the reaction products of the above-mentioned aliphatic alcohols with propylene oxide known as "Ucon-Fluid," some of which are still water-soluble, are useful as "Non-ionics."

Further useful "Non-ionics" are fatty acid or sulfonic acid alkylolamides, which are derived, for example, from mono- or di-ethanolamines, dihydroxypropylamine or other polyhydroxyalkylamines, for example, the glycamines. They can be replaced by amides of higher primary or secondary alkylamines and polyhydroxycarboxylic acids.

From the group of amineoxides, the "Non-ionics" derived from higher tertiary amines having a hydrophobic alkyl residue and two shorter alkyl and/or alkylol residues containing up to 4 carbon atoms each are of particular interest.

Amphoteric surface-active compounds contain in the molecule both acid and basic hydrophilic groups. To the acid groups belong carboxylic acid, sulfonic acid, sulfuric acid half ester, phosphonic acid and phosphoric acid partial ester groups. The basic groups may be primary, secondary, tertiary and quaternary ammonium groups.

Owing to their good compatibility with other surface-active compounds, carboxy, sulfate and sulfonate betaines have special practical interest. Suitable sulfobetaines are obtained, for example, by reacting tertiary amines containing at least one hydrophobic alkyl residue with sultones, for example propane- or butane-sultone. Corresponding carboxybetaines are obtained by reacting the said tertiary amines with chloroacetic acid, its salts or with chloroacetic acid esters and fission of the ester linkage.

The foaming capacity of the washing agents according to the invention may be increased or reduced by suitable combinations of different surface-active compounds as well as non-surface-active organic substances.

Suitable foam stabilizers in the case of surface-active compounds of the sulfonate or sulfate type, are chiefly surface-active carboxy- or sulfo-betaines and also the above-mentioned non-ionics of the alkylolamide type. Moreover, fatty alcohols or higher terminal diols are utilizable for this purpose.

Products with a reduced foaming capacity are chiefly intended for use in washing and dish-washing machines, in which in some cases a limited inhibition of foam is sufficient, while in other cases a stronger anti-foaming effect may be desired. Products which still foam in the average range of temperature up to about 65° C., but develops less and less foam as higher temperatures (70–100° C.) are reached, are of particular practical importance.

A reduced foaming power is often obtained with combinations of different types of surface-active compounds, especially with combinations of synthetic anionic surface-active compounds, above all of (1) sulfates and/or sulfonates or of (2) non-ionics on the one hand and (3) soaps on the other hand. With combinations of components (1) and (2) or (1), (2) and (3), the foaming behavior can be influenced by the respective soap used. In the case of soaps from preferably saturated fatty acids with 12 to 18 carbon atoms, the inhibition of foam is small, while a stronger anti-foaming effect is attained, especially in the high temperature range, by soaps from saturated fatty acid mixtures with 20 to 26, preferably 20 to 22 carbon atoms, the amount of which may constitute 5 to 10% by weight of the total soap fraction present in the surface-active combination.

The foaming capacity of the surface-active compounds, however, can also be reduced by additions of known, non-surface-active foam inhibitors. These include possibly chlorine-containing N-alkylated aminotriazines, which are obtained by reacting 1 mol of cyanuric acid chloride with 2 to 3 mol of a mono- and/or di-alkylamine with 6 to 20, preferably 8 to 18 carbon atoms in the alkyl residue. Aminotriazine- or melamine-derivatives, which contain polypropylene glycol or polybutylene glycol chains, while 10 to 100 of such glycol residues may be contained in the molecule, have a similar action. Such compounds are obtained, for example, by addition of corresponding amounts of propylene and/or butylene oxide to aminotriazines, especially to melamine. Products preferably used are obtained, for example, by reacting 1 mol of melamine with at least 20 mol of propylene oxide or at least 10 mol of butylene oxide. Products have been found to be specially active which are obtained by addition of 5 to 10 mol of propylene oxide to 1 mol of melamine and further addition of 10 to 50 mol of butylene oxide to this propylene oxide derivative.

Other non-surface-active, water-insoluble, organic compounds, such as paraffins or haloparaffins with melting points below 100° C., aliphatic $C_{18}$- to $C_{40}$-ketones and aliphatic carboxylic acid esters, which contain at least 18 carbon atoms in the acid or in the alcohol residue, possibly also in both of these two residues (for example triglycerides or fatty acid-fatty alcohol esters), can also be used as foam inhibitors, especially in combination with anionic synthetic surface-active compounds and soaps.

The non-surface-active foam inhibitors are often only fully active at temperatures at which they are present in the liquid state, so that the foaming behavior of the products can be controlled by choice of suitable foam inhibitors in a similar way to the choice of soaps from fatty acids of suitable chain lengths.

When foam stabilizers are combined with foam inhibitors dependent upon temperature, products are obtained which readily foam at lower temperatures while progressively more weakly foam as the temperature approaches the boiling temperature.

Particularly weakly foaming non-ionics, which may be used both alone and in combination with anionic, amphoteric and non-ionic surface-active compounds and reduce the foaming power of more strongly foaming, especially non-ionic, surface-active compounds, are addition products of propylene oxide to the above-described surface-active polyethylene glycol ethers, and also the above-described "Pluronics," "Tetronics" and "Ucon" fluid.

As builders which assist the action of the surface-active compounds in the washing liquor, are suitable weakly acid, neutral or alkaline reacting inorganic or organic salts which may be those with a pronounced complex-forming power for calcium ions or those which posses practically no such complex-forming ability.

Salts which are weakly acid, neutral or alkaline reacting are utilizable in the compositions of the invention, for example, the alkali metal bicarbonates, carbonates, silicates, orthophosphates, sulfates, di- or tetra-alkali metal pyrophosphates, complex forming alkali metal metaphosphates and the alkali metal salts of organic, non-surface-active sulfonic acids, carboxylic acids and sulfocarboxylic acids containing 1 to 8 carbon atoms. To the latter belong, for example, water-soluble salts of benzene-, toluene- or xylene-sulfonic acids, water-soluble salts of sulfoacetic acid, sulfobenzoic acid or salts of sulfodicarboxylic acids and the salts of acetic acid, lactic acid, citric acid and tartaric acid.

Further, the water-soluble salts of higher molecular weight polycarboxylic acids are useful as buliders, especially polymerizates of maleic acid, itaconic acid, mesaconic acid, fumaric acid, aconitic acid, methylenemalonic acid and citraconic acid. Mixed polymerizates of these acids with one another or with other polymerizable substances, as for example with ethylene, propylene, acrylic acid, methacrylic acid, crotonic acid, 3-butanecarboxylic acid, 3-methyl-3-butane-carboxylic acid and also with vinyl methyl ether, vinyl acetate, isobutylene, acrylamide and styrene, are also useful.

Suitable complex forming builders are the weakly acid reacting metaphosphates and the alkaline reacting polyphosphates, especially the tripolyphosphate. They may be replaced wholly or partly by organic complex-forming compounds.

The latter include, for example, nitrilotriacetic acid, ethylenediaminetetraacetic acid, N-hydroxyethyl-ethylenediaminetriacetic acid, polyalkylene-polyamine-N-polyacetic acids and other known organic complex-forming compounds. Combinations of different complex-forming compounds may also be used. Di- and poly-phosphonic acids of the following constitutions also belong to the other known complex-forming compounds.

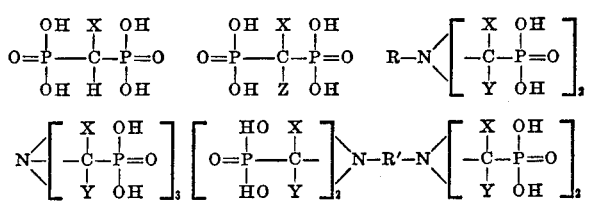

wherein R represents alkyl and R' represents alkylene, both with 1 to 8, preferably with 1 to 4 carbon atoms X and Y represent hydrogen atoms or alkyl with 1 to 4 carbon atoms and Z represents the group —OH, —$NH_2$ or —NXR. For practical use the following compounds are principally suitable: methylenediphosphonic acid, 1-hydroxyethane-1,1-diphosphonic acid, 1-aminoethane-1,1-diphosphonic acid, amino-tri(methylenephosphonic acid), methylamino- or ethylamino-di(methylenephosphonic acid) and also ethylenediaminotetra(methylenephosphonic acid). All these complex-forming substances may be present as the free acids, but are preferred as the alkali metal salts.

Furthermore, dirt or soil suspension agents carriers may be contained in the washing agents according to the invention, which keep the dirt, detached from the fiber, suspended in the washing bath and thus prevent graying. For this purpose water-soluble colloids of mostly organic nature are suitable, as for example, the water-soluble salts of polymeric carboxylic acids, glue, gelatine, salts of ethercarboxylic acids or ethersulfonic acids of starch or cellulose or salts of acid sulfuric acid esters of cellulose or starch. Water-soluble polyamides containing acid groups are also suitable for this purpose. Further, soluble starch and starch products other than those named above can be used, as for example, degraded starch, aldehyde starches and so on. Polyvinylpyrrolidone is also utilizable.

The components of the washing compositions according to the invention, especially the builders, are usually selected so that the preparations have a distinct alkaline reaction, so that the pH value of a 1% solution of the preparation mostly lies in the region of 8 to 12, preferably 9 to 12, and in particular 9.5 to 11.5.

The washing composition according to the invention may also contain enzymes. The enzymes used are then present as the further separate powder component C or as a part thereof.

The enzymes which may be utilized may be obtained from animals, microorganisms such as bacteria or fungi, and plants, especially from digestive ferments, yeasts and strains of bacteria. They usually represents a complicated mixture composed of various enzymatic active substances. According to their action they are denoted as proteases, carbohydrases, esterases, lipases, oxidoreductase, catalases, peroxidases, ureases, isomerases, lyases, transferases, desmolases or nucleases. The enzymatic subtances, particularly proteases or amylases, obtained from strains of bacteria or fungi, such as *Bacillus subtilis* and *Streptomyces griseus*, are of special interest. Further useful enzymes are pepsin, pancreatin, trypsin, papain and diastase. The enzyme preparations obtained from *Bacillus subtilis*, however, have the advantage, as compared with the last-named enzymes, in that they are relatively stable with respect to alkali, percompounds and anionic detergents, and even at temperatures between 45° and 70° C. are still not appreciable inactivated.

The enzymes are marketed by the producers usually in the form of aqueous solutions of active substances or with addition of blending agents, as powders. Suitable blending agents are sodium sulfate, sodium chloride, alkali metal ortho-, pyro- or poly-phosphates, especially tripolyphosphates. The still moist enzyme preparations are frequently incorporated with calcined salts, which then, in some cases with agglomeration of the particles present to larger particles, bind the water present together with the enzymatic substance as water of crystallization.

If the enzymatic substances are present as dry products, liquid or paste-like or possibly solid non-ionic, preferably surface-active, organic compounds, especially the above-described "Non-ionics," can also be used at room temperature for binding the enzymatic active substance to the respective preparation to be made. For this purpose, a mixture of the components of the combination of surface-active compounds or of the washing agent and the enzymatic substance, for example, is sprayed with these non-ionic products, or the enzymatic substance is dispersed in the said non-ionic substances and this dispersion is with the other constituents of the product. If the other constituents of the products are solids, the dispersion of the enzymatic substances in the non-ionic component can be sprayed on the other solid constituents.

The enzymes, or combinations of enzymes with variable action, are generally used in quantities such that the finished products have protease activities of 50 to 5000, preferably 100 to 2500 LVE/g. and/or amylase activities of 20 to 5000, preferably 50 to 2000 SKBE/g. and/or lipase activities of 2 to 1000, preferably 5 to 500 IE/g.

The above data on the content of enzymes and activities of the preparations according to the invention are obtained from the activities of those enzyme preparations which are available at the present time, from the standpoint of economy, for use in the washing agent field. From the technical-chemical standpoint the enzyme activities of the preparations according to the invention can be increased, if feasible, so that the activities as regards proteases and amylases can be raised to 5 times, and as regards lipases, to 10 times the above given maximum values. Therefore, should, in the future, enzyme preparations with higher enzyme contents be supplied, which also appear suitable economically for use in washing agents, one has the choice either of keeping the enzyme activity of the preparation to the above given height by use of smaller amounts of enzymes or of increasing the enzyme activity with use of the same amount of enzymes.

The following references in the literature are referred to relative to the determination of the enzyme activities:

Determination of the activity of proteases by Lohlein-Volhard:

A. Kunzel: "Gerbereichemisches Taschenbuch," 6th Ed., Dresden and Leipzig, 1955.

Determination of the activity of amylases:

J. Wohlmuth: "Biochemische Zeitschrift," 1908, vol. 9, pages 1–9; and

R. M. Sandsteadt, E. Kneen and M. J. Blish: "Cereal Chemistry," 1949, vol. 16, pages 712–723.

Determination of the activity of lipases:

R. Willstatter, E. Waldschmidt-Leitz and Fr. Memmen: "Hoppe-Seyler's Zeitschrift fur physiologische Chemie," 1923, vol. 125, pages 110–117; and R. Boissonas: "Helvetia Chimica Acta," 1948, vol. 31, pages 1571–1576.

The brighteners which may be used are mostly, if not exclusively, derivatives of diaminostilbenesulfonic acid, diarylpyrazolines and aminocoumarins.

Examples of brighteners from the class of diaminostilbenesulfonic acid derivatives are compounds according to the formula

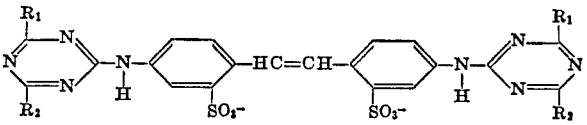

In the formula $R_1$ and $R_2$ signify halogen atoms or alkoxy groups, amino groups or residues of aliphatic, aromatic or heterocyclic, primary or secondary amines, or residues of aminosulfonic acids, while aliphatic residues present in the above groups preferably contain 1 to 4 and especially 2 to 4 carbon atoms, and in the heterocyclic ring systems, five- or six-membered rings are usually concerned. Aniline, anthranilic acid or anilinesulfonic acid residues are preferred as the aromatic amines. Brighteners derived from diaminostilbenesulfonic acid are mostly used as cotton brighteners. The following products derived from the above formula in which $R_1$ represents the residue —NH—$C_6H_5$ and $R_2$ may represent the following residues, are at present on the market:

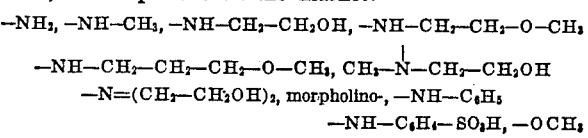

Some of these brighteners are to be ragarded as transitional types to the cotton brighteners as regards their affinity for the fiber, for example, the brightener in which $R_2$ equals —NH—$C_6H_5$. The compound 4,4'-bis-(4-phenyl-vicinal-triazolyl - 2) - stilbenedisulfonic acid - 2,2' also belong to the cotton brighteners of the diaminostilbenesulfonic acid type.

Diarylpyrazolines of Formulas II and III belong to the polyamide brighteners, of which again a few have a certain affinity for cotton fibers:

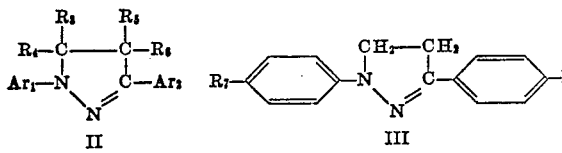

In Formula II, $R_3$ and $R_5$ represent hydrogen atoms, or alkyl or aryl residues possibly substituted by carboxyl, carbonamide or ester groups.

$R_4$ and $R_6$ represent hydrogen or short-chain alkyl residues.

$Ar_1$ and $Ar_2$ represent aryl residues such as phenyl, diphenyl or naphthyl, which may carry further substituents such as hydroxy, alkoxy, hydroxyalkyl, amino, alkylamino, acylamino, carboxyl, carboxylic acid ester, sulfonic acid, sulfonamide and sulfone groups or halogen atoms.

Brighteners of this type found at present on the market are derived from the Formula III, and the residue $R_7$ may represent the groups Cl, —$SO_2$—$NH_2$,

and —COO—$CH_2$—$CH_2$—O—$CH_2$, while the residue $R_8$ in all cases represents a chlorine atom. 9-cyano-anthracene is also on the market as a polyamide brightener.

In addition, aliphatic or aromatic substituted amino coumarins belong to the polyamide brighteners, for example 4 - methyl-7-dimethylamino- or 4-methyl-7-diethylamino-coumarin. Further useful polyamide brighteners are the compounds 1-(benzimidazolyl-2')-2-(N-hydroxyethyl-benzimidazolyl-2')-ethylene and 1-N-ethyl-3-phenyl-7-diethylamino-carbostyril. Suitable brighteners for polyester and polyamide fibers are the compounds 2,5-di-(benzoxazolyl-2')-thiophene and 1,2-di-(5'-methyl-benz-oxazolyl-2')-ethylene.

If the brighteners are present together with other constituents of the products according to the invention as aqueous solutions or pastes and are converted into the solid state by spray drying, it is advisable to incorporate at least 0.1% and preferably 0.2% to 1% by weight of the solid products, of organic complex-forming compounds for the stabilization of the brighteners.

The following specific embodiments illustrate the invention without limiting the same in any respect.

EXAMPLES

In the following tables, the compositions of some washing materials according to the invention are described. In these, the values not in bracket signify the percent contents of the individual components, based on the total washing composition, while the numerical values in brackets give the percent contents of the individual components, based on the respective washing composition components A, B, C or D.

The salt-like components contained in the washing compositions, that is the salt-like surface-active compounds, other organic salts and also inorganic salts, are present as sodium salts, if it is not expressly stated otherwise. The symbols or abbreviations used signify:

"ABS" is the salt of an alkylbenzenesulfonic acid with 10 to 15, preferably 11 to 13, carbon atoms in the alkyl chain, obtained by condensation of straight-chain olefins with benzene and sulfonation of the alkylbenzene thus formed.

"Alkanesulfonate" is a sulfonate obtained from paraffins with 12 to 16 carbon atom by the sulfoxidation method.

"HST-estersulfonate" "HT-estersulfonate" are two sulfonates obtained from the methyl esters of two palmitic acid-stearic acid mixtures by sulfonation with $SO_3$, the palmitic acid content in the starting fatty acid for the first-named product being about 45% by weight, and for the second-named product about 27% by weight.

"Olefinsulfonate" is a sulfonate obtained from mixtures of olefins with 12 to 18 carbon atoms by sulfonation with $SO_3$ and hydrolysis of the sulfonation product with aqueous sodium hydroxide, which consists substantially of alkenesulfonate and hydroxyalkanesulfonate, but besides also still contains small amounts of alkane disulfonates. Each olefinsulfonate-containing preparation was prepared with use of two different types of olefinsulfonate; one as prepared from a mixture of straight-chain terminal olefins, and the other was from a mixture of non-terminal olefins.

"KA-sulfate" "TA-sulfate" are the salts of sulfated substantially saturated fatty alcohols prepared by reduction of coconut fatty acid and tallow fatty acid respectively.

"KA-EO-Sulfate" and "TA-EO-Sulfate" and "OA-EO-Sulfate" are respectively the sulfated addition products of 2 mols of ethylene oxide to 1 mol of coconut fatty alcohol, 3 mols of ethylene oxide to 1 mol of tallow fatty alcohol and 2 mols of ethylene oxide to 1 mol of oleyl alcohol.

"OA+5EO" and "OA+10EO" are the products of addition of ethylene oxide (EO) to technical oleyl alcohol (OA), in which the numbers characterize the molar amounts of ethylene oxide added on to 1 mol of alcohol.

"Carboxybetaine" and "Sulfobetaine" are the betaines prepared by reacting a coconut alkyl-dimethylamine prepared from coconut fatty acid with chloracetic acid and propanesultone respectively.

"NTA" and "EDTA" are the sodium salts of nitrilotriacetic acid and ethylenediaminotetraacetic acid respectively.

"Phosphonate" is the sodium salt of 1-hydroxyethane-1,1-diphosphonic acid, this salt may be replaced with a similar result by the sodium salts of 1-aminoethane-1,1-diphosphonic acid, amino-tri-(methylenephosphonic acid), methylamino- or ethylamino - di - (methylenephosphonic acid) and ethylenediaminotetra - (methylenephosphonic acid).

"CMC" is the sodium salt of carboxymethylcellulose.

The composition of the fatty acid mixtures, from which the different soaps contained in the products according to the invention were prepared, can be seen from the following Table I.

TABLE I.—COMPOSITIONS OF THE FATTY ACID MIXTURES CORRESPONDING TO THE SOAPS

| | Percent (wt.) of fatty acid component in the soap | | | |
|---|---|---|---|---|
| | B | C | D | G |
| No. of carbon atoms in the fatty acid: | | | | |
| $C_{10}$ | 2 | 2 | 4 | 1 |
| $C_{12}$ | 19 | 21 | 16 | 6 |
| $C_{14}$ | 8 | 6 | 10 | 5 |
| $C_{16}$ | 4 | 16 | 25 | 28 |
| $C_{18}$ | 22 | 33 | 45 | 60 |
| $C_{20}$ | 8 | 4 | | |
| $C_{22}$ | 37 | 18 | | |
| Iodine value of the fatty acid mixture | 4 | 8 | 6 | 4 |

A mixture of about 45% of a di-(alkylamino)-monochloro-triazine and about 55% of a N-N'-N''-trialkylmelamine was used as foam inhibitor. In all these triazine derivatives the alkyl residues were present as a mixture of homologs with 8 to 18 carbon atoms. The monochlorotriazine derivatives or the trialkylmelamine can also be used with a similar result. If the described products contain synthetic sulfates or sulfonates together with soap, the other, non-surface-active foam inhibitors mentioned in the description could be used, as for example, paraffin oil or paraffin. In the production of the preparations, the foam inhibitor used, dissolved in a suitable organic solvent or in the molten state, was sprayed on the moving pulverulent preparation by means of a jet.

The washing compositions described in Examples 1 to 18 were prepared in the following way:

The substance contained in the powder component A were treated in the usual way with water to give a paste-like mixture, which after drying with heat in the atomizing tower, provided a powder of the given compositions. If the washing compositions contained betaines and non-ionics, these were sprayed on the tripolyphosphate present in a further separate powder component, while possibly present foam inhibitors were sprayed on the perborate monohydrate. After admixing all the constituents, the desired washing composition was obtained in a storable, non-dusty condition.

These directions for the preparation chosen in the case of the washing composition of the examples may be considerably varied. Thus, for example, the betaines and the non-ionics may also be sprayed on the powder component A or on the mixture of all components during the mixing process or thereafter. It is merely advisable to introduce the foam inhibitor separately from the other sprayed-on components.

The washing compositions according to the invention may also contain other additives customary in washing compositions, as for example disinfectants, etc.

The washing compositions according to the invention may also contain textile softeners in amounts of, for example, 3% to 30%, preferably 5% to 20% and especially 5% to 15% by weight. These textile softeners may be incorporated as desired in the powder component A or in another way may be introduced into the washing composition. The Examples 13 to 18 and 31 to 36 describe such washing compositions. The textile softeners used were dissolved in the aqueous solution of the surface-active compound or finely dispersed therein, during the preparation of the aqueous mixture to be atomized. The following textile softeners were used:

"TAMB": a product obtained by reaction of about 3 mols of hardened beef tallow with 1 mol of N-hydroxyethylethylenediamine of about the following composition:

5.6% by weight of tri-fatty acid-diamide-ester
37.8% by weight of di-fatty acid diamide
20.8% by weight of fatty acid monoamides
13.6% by weight of fatty acid triglycerides
8.2% by weight of fatty acid diglycerides
5.1% by weight of fatty acid monoglycerides
8.9% by weight of free fatty acid and by-products.

"$C_{16-21}$-carboxylic acid," the carboxylic acid mixture, prepared from a mixture of straight-chain olefins with 15 to 20 carbon atoms by addition of CO and $H_2O$, used in the form of the sodium salt.

"Dioctylacetate," sodium salt of the carboxylic acid $(C_8H_{17})_2$>CH—COOH.

"Dialkylaminopropionate," sodium salt of N-dialkyl-$\beta$-aminopropionic acid (alkyl residues from coconut fatty acid).

TABLE II

| | Component of the washing composition | Example number 1 | | Example number 2 | | Example number 3 | |
|---|---|---|---|---|---|---|---|
| A | ABS | 7.5 | (33.63) | 6.00 | (21.71) | 7.30 | (25.39) |
| | KA-EO-sulfate | | | | | | |
| | TA-sulfate | | | 0.50 | (1.81) | | |
| | KA-sulfate | | | 1.50 | (5.43) | 2.00 | (6.96) |
| | Soap B | | | | | | |
| | Soap D | 4.2 | (18.83) | | | 2.00 | (6.96) |
| | Fs-amide plus 8 EO | 3.5 | (15.70) | | | | |
| | CMC | 0.5 | (2.24) | 2.00 | (7.24) | 1.80 | (6.26) |
| | EDTA | 0.1 | (0.45) | 0.20 | (0.72) | 0.30 | (1.04) |
| | NTA | | | | | | |
| | Phosphonate | | | 6.00 | (21.71) | 8.00 | (27.83) |
| | Waterglass | 2.9 | (13.00) | 6.00 | (21.71) | 4.50 | (15.65) |
| | $MgSiO_3$ | 1.0 | (4.48) | 2.50 | (9.04) | | |
| | $Na_2SO_4$ | 0.80 | (3.59) | 0.64 | (2.32) | 0.75 | (2.61) |
| | Brightener | 0.35 | (1.58) | 0.28 | (1.01) | 0.82 | (2.85) |
| | Water | 1.45 | (6.50) | 2.02 | (7.30) | 1.28 | (4.45) |
| Sum A | | 22.30 | (100.00) | 27.64 | (100.00) | 28.75 | (100.00) |
| B | $NaBO_2.H_2O_2$ | 21.30 | (100.00) | 20.80 | (100.00) | 17.55 | (100.00) |
| C | Carboxybetaine | | | | | 0.80 | (1.58) |
| | Sulfobetaine | | | 0.70 | (1.46) | | |
| | $Na_5P_3O_{10}$ | 44.10 | (78.47) | 40.00 | (83.22) | 35.00 | (69.17) |
| | $Na_2CO_3$ | 21.10 | (21.53) | 7.36 | (15.32) | 14.80 | (29.25) |
| Sum C | | 56.20 | (100.00) | 48.06 | (100.00) | 50.60 | (100.00) |
| D | Foam inhibitor | 0.20 | (100.00) | 0.50 | (14.29) | 0.60 | (19.35) |
| | OA plus 10 EO | | | 3.00 | (85.71) | 2.50 | (80.65) |
| Sum D | | 0.20 | (100.00) | 3.50 | (100.00) | 3.10 | (100.00) |
| Total sum | | 100.00 | | 100.00 | | 100.00 | |

| | Component of the washing composition | Example number 4 | | Example number 5 | | Example number 6 | |
|---|---|---|---|---|---|---|---|
| A | ABS | 5.00 | (11.01) | 12.00 | (32.52) | 7.80 | (28.77) |
| | KA-EO-sulfate | 1.50 | (3.30) | 5.00 | (13.55) | 2.30 | (8.48) |
| | TA-sulfate | 0.30 | (0.66) | | | | |
| | KA-sulfate | 1.20 | (2.64) | 2.50 | (6.77) | | |
| | Soap B | 4.20 | (9.25) | | | 3.70 | (13.65) |
| | Soap D | | | | | | |
| | Fs-amide plus 8 EO | | | | | 1.50 | (5.53) |
| | CMC | 1.30 | (2.86) | 1.70 | (4.61) | | |
| | EDTA | 0.22 | (0.48) | | | 1.60 | (5.90) |
| | NTA | 15.00 | (33.03) | | | 0.50 | (1.84) |
| | Phosphonate | 7.20 | (15.85) | 9.00 | (24.39) | 3.00 | (11.07) |
| | Waterglass | 5.00 | (11.01) | 4.50 | (12.20) | 4.00 | (14.75) |
| | $MgSiO_3$ | 2.00 | (4.40) | | | | |
| | $Na_2SO_4$ | 0.42 | (0.92) | 0.90 | (2.44) | 0.81 | (2.99) |
| | Brightener | 0.75 | (1.65) | | | 0.35 | (1.29) |
| | Water | 1.33 | (2.94) | 1.30 | (3.52) | 1.55 | (5.73) |
| Sum A | | 45.42 | (100.00) | 36.90 | (100.00) | 27.11 | (100.00) |

TABLE II—Continued

| | Component of the washing composition | Example number 4 | | Example number 5 | | Example number 6 | |
|---|---|---|---|---|---|---|---|
| B | NaBO₂·H₂O₂ | 15.60 | (100.00) | 20.50 | (100.00) | 19.80 | (100.00) |
| C | Carboxybetaine | 0.50 | (1.28) | 0.90 | (2.14) | ----- | (-----) |
| | Sulfobetaine | ----- | (-----) | ----- | (-----) | ----- | (-----) |
| | Na₅P₃O₁₀ | 38.48 | (98.72) | 41.10 | (97.86) | 44.79 | (100.00) |
| | Na₂CO₃ | ----- | (-----) | ----- | (-----) | ----- | (-----) |
| Sum C | | 38.98 | (100.00) | 42.00 | (100.00) | 44.79 | (100.00) |
| D | Foam inhibitor | ----- | (-----) | 0.60 | (100.00) | 0.30 | (3.61) |
| | OA plus 10 EO | ----- | (-----) | ----- | (-----) | 8.00 | (96.39) |
| Sum D | | ----- | (-----) | 0.60 | (100.00) | 8.30 | (100.00) |
| Total sum | | 100.00 | | 100.00 | | 100.00 | |

| | Component of the washing composition | Example number 7 | | Example number 8 | | Example number 9 | |
|---|---|---|---|---|---|---|---|
| A | Alkanesulfonate | ----- | (-----) | ----- | (-----) | 7.50 | (30.27) |
| | HST-estersulfonate | 7.50 | (39.94) | 4.00 | (11.63) | ----- | (-----) |
| | HT-estersulfonate | ----- | (-----) | ----- | (-----) | ----- | (-----) |
| | Olefinsulfonate | ----- | (-----) | ----- | (-----) | ----- | (-----) |
| | OA-EO-sulfate | ----- | (-----) | ----- | (-----) | ----- | (-----) |
| | TA-EO-sulfate | ----- | (-----) | ----- | (-----) | ----- | (-----) |
| | KA-EO-sulfate | ----- | (-----) | ----- | (-----) | ----- | (-----) |
| | TA-sulfate | ----- | (-----) | 2.30 | (6.69) | 1.70 | (6.86) |
| | KA-sulfate | ----- | (-----) | ----- | (-----) | ----- | (-----) |
| | Soap B | 2.30 | (12.25) | ----- | (-----) | ----- | (-----) |
| | Soap C | ----- | (-----) | 6.30 | (18.32) | ----- | (-----) |
| | Soap G | ----- | (-----) | ----- | (-----) | ----- | (-----) |
| | CMC | ----- | (-----) | 1.90 | (5.52) | 1.20 | (4.84) |
| | EDTA | ----- | (-----) | 0.25 | (0.73) | 0.50 | (2.02) |
| | NTA | ----- | (-----) | 5.00 | (14.55) | ----- | (-----) |
| | Phosphonate | ----- | (-----) | 8.00 | (23.26) | 6.80 | (27.44) |
| | Waterglass | 3.70 | (19.70) | 4.00 | (11.63) | 3.80 | (15.33) |
| | MgSiO₃ | 2.30 | (12.25) | ----- | (-----) | ----- | (-----) |
| | Na₂SO₄ | 0.76 | (4.04) | 0.39 | (1.13) | 0.78 | (3.15) |
| | Brightener | 0.73 | (3.89) | 0.44 | (1.28) | 0.93 | (3.75) |
| | Water | 1.49 | (7.93) | 1.81 | (5.26) | 1.57 | (6.34) |
| Sum A | | 18.78 | (100.00) | 34.39 | (100.00) | 24.78 | (100.00) |
| B | NaBO₂·H₂O₂ | 19.00 | (100.00) | 16.25 | (100.00) | 15.28 | (100.00) |
| C | Carboxybetaine | ----- | (-----) | ----- | (-----) | 0.40 | (0.70) |
| | Sulfobetaine | ----- | (-----) | 0.60 | (1.26) | ----- | (-----) |
| | Na₅P₃O₁₀ | 59.52 | (100.00) | 39.00 | (82.35) | 48.00 | (84.45) |
| | Na₂CO₃ | ----- | (-----) | 7.76 | (16.39) | 8.44 | (14.85) |
| Sum C | | 59.52 | (100.00) | 47.36 | (100.00) | 56.84 | (100.00) |
| D | Foam inhibitor | 0.20 | (7.41) | ----- | (-----) | 0.40 | (12.90) |
| | OA plus 5 EO | ----- | (-----) | 2.00 | (100.00) | ----- | (-----) |
| | OA plus 10 EO | 2.50 | (92.59) | ----- | (-----) | 2.70 | (87.10) |
| Sum D | | 2.70 | (100.00) | 2.00 | (100.00) | 3.10 | (100.00) |
| Total sum | | 100.00 | | 100.00 | | 100.00 | |

| | Component of the washing composition | Example number 10 | | Example number 11 | | Example number 12 | |
|---|---|---|---|---|---|---|---|
| A | Alkanesulfonate | ----- | (-----) | ----- | (-----) | ----- | (-----) |
| | HST-estersulfonate | ----- | (-----) | ----- | (-----) | ----- | (-----) |
| | HT-estersulfonate | ----- | (-----) | ----- | (-----) | ----- | (-----) |
| | Olefinsulfonate | 5.00 | (11.84) | ----- | (-----) | ----- | (-----) |
| | OA-EO-sulfonate | ----- | (-----) | 4.00 | (17.93) | ----- | (-----) |
| | TA-EO-sulfate | 2.50 | (5.92) | ----- | (-----) | 5.00 | (14.99) |
| | KA-EO-sulfate | ----- | (-----) | ----- | (-----) | 1.00 | (3.00) |
| | TA-sulfate | ----- | (-----) | 1.80 | (8.07) | 1.00 | (3.00) |
| | KA-sulfate | ----- | (-----) | 5.00 | (22.41) | ----- | (-----) |
| | Soap B | ----- | (-----) | ----- | (-----) | ----- | (-----) |
| | Soap C | 7.20 | (17.05) | ----- | (-----) | 3.00 | (8.99) |
| | Soap G | ----- | (-----) | ----- | (-----) | 1.30 | (3.90) |
| | CMC | 1.40 | (3.32) | 1.50 | (6.72) | ----- | (-----) |
| | EDTA | 0.40 | (0.95) | ----- | (-----) | 10.00 | (29.99) |
| | NTA | 8.00 | (18.94) | 5.00 | (22.41) | 7.00 | (20.99) |
| | Phosphonate | 7.50 | (17.76) | 3.50 | (15.69) | 3.70 | (11.09) |
| | Waterglass | 4.20 | (9.95) | ----- | (-----) | ----- | (-----) |
| | MgSiO₃ | 3.00 | (7.10) | ----- | (-----) | ----- | (-----) |
| | Na₂SO₄ | 0.23 | (0.54) | 0.31 | (1.39) | 0.35 | (1.05) |
| | Brightener | 1.08 | (2.56) | ----- | (-----) | ----- | (-----) |
| | Water | 1.72 | (4.07) | 1.20 | (5.38) | 1.00 | (3.00) |
| Sum A | | 42.23 | (100.00) | 22.31 | (100.00) | 33.35 | (100.00) |
| B | NaBO₂·H₂O₂ | 18.20 | (100.00) | 14.30 | (100.00) | 21.80 | (100.00) |
| C | Carboxybetaine | ----- | (-----) | 0.80 | (1.37) | 0.60 | (1.45) |
| | Sulfobetaine | 0.50 | (1.39) | ----- | (-----) | ----- | (-----) |
| | Na₅P₃O₁₀ | 35.57 | (98.61) | 47.00 | (80.49) | 40.75 | (98.55) |
| | Na₂CO₃ | ----- | (-----) | 10.59 | (18.14) | ----- | (-----) |
| Sum C | | 36.07 | (100.00) | 58.39 | (100.00) | 41.35 | (100.00) |
| D | Foam inhibitor | ----- | (-----) | ----- | (-----) | 0.50 | (14.29) |
| | OA plus 5 EO | ----- | (-----) | 5.00 | (100.00) | 3.00 | (85.71) |
| | OA plus 10 EO | 3.50 | (100.00) | ----- | (-----) | ----- | (-----) |
| Sum D | | 3.50 | (100.00) | 5.00 | (100.00) | 3.50 | (100.00) |
| Total sum | | 100.00 | (-----) | 100.00 | (-----) | 100.00 | (-----) |

TABLE II—Continued

| Component of the washing composition | Example number 13 | | Example number 14 | | Example number 15 | |
|---|---|---|---|---|---|---|
| A — ABS | 7.6 | (20.72) | 6.0 | (17.09) | 7.3 | (21.44) |
| TA-sulfate | | | 0.5 | (1.42) | | |
| KA-sulfate | | | 1.5 | (4.27) | 2.0 | (5.87) |
| Soap D | 1.8 | (4.97) | | | 1.2 | (3.52) |
| Fs-amide plus 8 EO | 2.5 | (6.91) | | | | |
| TAMB | 9.0 | (24.86) | | | | |
| $C_{10-11}$-carboxylic acid | | | 7.5 | (21.37) | | |
| Dioctylacetate | | | | | 6.5 | (19.09) |
| Dialkylaminopropionate | 0.5 | (1.38) | 2.0 | (5.70) | 1.8 | (5.29) |
| CMC | 0.5 | (1.38) | 2.0 | (5.70) | 1.8 | (5.29) |
| EDTA | 0.1 | (0.28) | 0.2 | (0.57) | 0.3 | (0.88) |
| Phosphonate | 8.5 | (23.48) | 6.0 | (17.09) | 8.0 | (23.49) |
| Waterglass | 2.9 | (8.01) | 6.0 | (17.09) | 4.5 | (13.22) |
| $MgSiO_3$ | 1.0 | (2.76) | 2.5 | (7.12) | | |
| $Na_2SO_4$ | 0.8 | (2.21) | 0.6 | (1.71) | 0.8 | (2.35) |
| Brightener | 0.2 | (0.55) | 0.3 | (0.85) | 0.35 | (1.03) |
| Water | 1.4 | (3.87) | 2.0 | (5.70) | 1.3 | (3.82) |
| Sum A | 36.2 | (100.00) | 35.1 | (100.00) | 34.05 | (100.00) |
| B — $NaBO_3 \cdot H_2O_2$ | 21.30 | (100.00) | 20.80 | (100.00) | 17.55 | (100.00) |
| C — Carboxybetaine | | | | | 0.8 | (1.77) |
| Sulfobetaine | | | 0.7 | (1.72) | | |
| $Na_5P_3O_{10}$ | 42.3 | (100.00) | 39.9 | (98.28) | 44.5 | (98.23) |
| Sum C | 42.3 | (100.00) | 40.6 | (100.00) | 45.3 | (100.00) |
| D — Foam inhibitor | 0.20 | (100.00) | 0.50 | (14.29) | 0.60 | (19.35) |
| OA plus 10 EO | | | 3.00 | (85.71) | 2.50 | (80.65) |
| Sum D | 0.20 | (100.00) | 3.50 | (100.00) | 3.10 | (100.00) |
| Total sum | 100.00 | | 100.00 | | 100.00 | |

| Component of the washing composition | Example number 16 | | Example number 17 | | Example number 18 | |
|---|---|---|---|---|---|---|
| A — Alkanesulfonate | | | 7.5 | (24.98) | | |
| HST-estersulfonate | 4.0 | (10.22) | | | | |
| OA-EO-sulfate | | | | | 4.0 | (14.13) |
| KA-sulfate | 2.3 | (5.87) | 1.7 | (5.66) | 1.8 | (6.36) |
| Soap B | | | | | 3.0 | (10.60) |
| Soap C | 4.1 | (10.47) | | | | |
| $C_{10-11}$ carboxylic acid | 7.0 | (17.88) | | | | |
| Dioctylacetate | | | 6.0 | (19.99) | | |
| Dialkylaminopropionate | | | | | 8.0 | (28.27) |
| CMC | 1.9 | (4.85) | 1.2 | (4.00) | 1.5 | (5.30) |
| EDTA | 0.2 | (0.51) | 0.5 | (1.67) | | |
| NTA | 5.0 | (12.77) | | | | |
| Phosphonate | 8.0 | (20.43) | 6.8 | (22.65) | 5.0 | (17.67) |
| Waterglass | 4.0 | (10.22) | 3.8 | (12.66) | 3.5 | (12.37) |
| $Na_2SO_4$ | 0.4 | (1.02) | 0.7 | (2.33) | 0.3 | (1.06) |
| Brightener | 0.4 | (1.02) | 0.3 | (1.00) | | |
| Water | 1.85 | (4.73) | 1.52 | (5.06) | 1.2 | (4.24) |
| Sum A | 39.15 | (100.00) | 30.02 | (100.00) | 28.3 | (100.00) |
| B — $NaBO_3 \cdot H_2O_2$ | 16.25 | (100.00) | 15.28 | (100.00) | 14.30 | (100.00) |
| C — Carboxybetaine | | | 0.4 | (0.78) | | |
| Sulfobetaine | 0.6 | (1.41) | | | 0.8 | (1.72) |
| $Na_5P_3O_{10}$ | 42.0 | (98.59) | 51.2 | (99.22) | 51.6 | (98.28) |
| Sum C | 42.6 | (100.00) | 51.6 | (100.00) | 52.4 | (100.00) |
| D — Foam inhibitor | | | 0.40 | (12.90) | | |
| OA plus 5 EO | 2.00 | (100.00) | | | 5.00 | (100.00) |
| OA plus 10 EO | | | 2.70 | (87.10) | | |
| Sum D | 2.00 | (100.00) | 3.10 | (100.00) | 5.00 | (100.00) |
| Total sum | 100.00 | | 100.00 | | 100.00 | |

| Component of the washing composition | Example number 19 | | Example number 20 | | Example number 21 | |
|---|---|---|---|---|---|---|
| A — ABS | 7.5 | (17.28) | 6.00 | (16.81) | 7.30 | (16.46) |
| KA-EO-sulfate | | | | | | |
| TA-sulfate | | | 0.50 | (1.40) | | |
| KA-sulfate | | | 1.50 | (4.20) | 2.00 | (4.51) |
| Soap B | | | | | | |
| Soap D | 4.2 | (9.67) | | | 2.00 | (4.51) |
| Fs-amide plus 8 EO | 3.5 | (8.06) | | | | |
| Carboxybetaine | | | | | 0.80 | (1.80) |
| Sulfobetaine | | | 0.70 | (1.96) | | |
| CMC | 0.5 | (1.15) | 2.00 | (5.60) | 1.80 | (4.06) |
| EDTA | 0.1 | (0.23) | 0.20 | (0.56) | 0.30 | (0.67) |
| NTA | | | | | | |
| Phosphonate | | | 6.00 | (16.81) | 8.00 | (18.04) |
| $Na_2CO_3$ | 21.10 | (48.64) | 7.36 | (20.62) | 14.80 | (33.38) |
| Waterglass | 2.9 | (6.68) | 6.00 | (16.81) | 4.50 | (10.15) |
| $MgSiO_3$ | 1.0 | (2.30) | 2.50 | (7.00) | | |
| $Na_2SO_4$ | 0.80 | (1.84) | 0.64 | (1.79) | 0.75 | (1.69) |
| Brightener | 0.35 | (0.81) | 0.28 | (0.78) | 0.82 | (1.85) |
| Water | 1.45 | (3.34) | 2.02 | (5.66) | 1.28 | (2.88) |
| Sum A | 43.40 | (100.00) | 35.70 | (100.00) | 44.35 | (100.00) |
| B — $NaBO_3 \cdot H_2O_2$ | 21.30 | (100.00) | 20.80 | (100.00) | 17.55 | (100.00) |
| C — $Na_5P_3O_{10}$ | 44.10 | (100.00) | 40.00 | (100.00) | 35.00 | (100.00) |
| D — Foam inhibitor | 0.20 | (100.00) | 0.50 | (14.29) | 0.60 | (19.35) |
| OA plus 10 EO | | | 3.00 | (85.71) | 2.50 | (80.65) |
| Sum D | 0.20 | (100.00) | 3.50 | (100.00) | 3.10 | (100.00) |
| Total sum | 100.00 | | 100.00 | | 100.00 | |

TABLE II—Continued

| | Component of the washing composition | Example number 22 | | Example number 23 | | Example number 24 | |
|---|---|---|---|---|---|---|---|
| A | ABS | 5.00 | (10.90) | 12.00 | (31.75) | 7.80 | (28.77) |
| | KA-EO-sulfate | 1.50 | (3.26) | 5.00 | (13.23) | 2.30 | (8.48) |
| | TA-sulfate | 0.30 | (0.65) | ---- | (----) | ---- | (----) |
| | KA-sulfate | 1.20 | (2.61) | 2.50 | (6.61) | ---- | (----) |
| | Soap B | 4.20 | (9.14) | ---- | (----) | 3.70 | (13.65) |
| | Soap D | ---- | (----) | ---- | (----) | ---- | (----) |
| | Fs-amide plus 8 EO | ---- | (----) | ---- | (----) | 1.50 | (5.53) |
| | Carboxybetaine | 0.50 | (1.09) | 0.90 | (2.38) | ---- | (----) |
| | CMC | 1.30 | (2.83) | 1.70 | (4.50) | ---- | (----) |
| | EDTA | 0.22 | (0.48) | ---- | (----) | 1.60 | (5.90) |
| | NTA | 15.00 | (32.68) | ---- | (----) | 0.50 | (1.84) |
| | Phosphonate | 7.20 | (15.68) | 9.00 | (23.81) | 3.00 | (11.07) |
| | Waterglass | 5.00 | (10.90) | 4.50 | (11.90) | 4.00 | (14.75) |
| | $MgSiO_3$ | 2.00 | (4.35) | ---- | (----) | ---- | (----) |
| | $Na_2SO_4$ | 0.42 | (0.91) | 0.90 | (2.38) | 0.81 | (2.99) |
| | Brightener | 0.75 | (1.63) | ---- | (----) | 0.35 | (1.29) |
| | Water | 1.33 | (2.89) | 1.30 | (3.44) | 1.55 | (5.73) |
| Sum A | | 45.92 | (100.00) | 37.80 | (100.00) | 27.11 | (100.00) |
| B | $NaBO_2 \cdot H_2O_2$ | 15.60 | (100.00) | 20.50 | (100.00) | 19.80 | (100.00) |
| C | $Na_5P_3O_{10}$ | 38.48 | (100.00) | 41.10 | (100.00) | 44.79 | (100.00) |
| D | Foam inhibitor | ---- | (----) | 0.60 | (100.00) | 0.30 | (3.61) |
| | OA plus 10 EO | ---- | (----) | ---- | (----) | 8.00 | (96.39) |
| Sum D | | ---- | (----) | 0.60 | (100.00) | 8.30 | (100.00) |
| Total sum | | 100.00 | | 100.00 | | 100.00 | |

| | Component of the washing composition | Example number 25 | | Example number 26 | | Example number 27 | |
|---|---|---|---|---|---|---|---|
| A | Alkanesulfonate | ---- | (----) | ---- | (----) | 7.50 | (22.32) |
| | HST-estersulfonate | 7.50 | (39.94) | 4.00 | (9.35) | ---- | (----) |
| | HT-estersulfonate | ---- | (----) | ---- | (----) | ---- | (----) |
| | Olefinsulfonate | ---- | (----) | ---- | (----) | ---- | (----) |
| | OA-EO-sulfate | ---- | (----) | ---- | (----) | ---- | (----) |
| | TA-EO-sulfate | ---- | (----) | ---- | (----) | ---- | (----) |
| | KA-EO-sulfate | ---- | (----) | ---- | (----) | ---- | (----) |
| | TA-sulfate | ---- | (----) | ---- | (----) | ---- | (----) |
| | KA-sulfate | ---- | (----) | 2.30 | (5.38) | (1.70) | (5.5) |
| | Soap B | 2.30 | (12.25) | ---- | (----) | ---- | (----) |
| | Soap C | ---- | (----) | 6.30 | (14.74) | ---- | (----) |
| | Soap G | ---- | (----) | ---- | (----) | ---- | (----) |
| | Carboxybetaine | ---- | (----) | ---- | (----) | 0.40 | (1.18) |
| | Sulfobetaine | ---- | (----) | 0.60 | (1.40) | ---- | (----) |
| | CMC | ---- | (----) | 1.90 | (4.44) | 1.20 | (3.57) |
| | EDTA | ---- | (----) | 0.25 | (0.58) | 0.50 | (1.48) |
| | NTA | ---- | (----) | 5.00 | (11.70) | ---- | (----) |
| | Phosphonate | ---- | (----) | 8.00 | (18.71) | 6.80 | (20.24) |
| | $Na_2CO_3$ | ---- | (----) | 7.76 | (18.15) | 8.44 | (25.12) |
| | Waterglass | 3.70 | (19.70) | 4.00 | (9.36) | 3.80 | (11.30) |
| | $MgSiO_3$ | 2.30 | (12.25) | ---- | (----) | ---- | (----) |
| | $Na_2SO_4$ | 0.76 | (4.04) | 0.39 | (0.91) | 0.78 | (2.31) |
| | Brightener | 0.73 | (3.89) | 0.44 | (1.03) | 0.93 | (2.76) |
| | Water | 1.49 | (7.93) | 1.81 | (4.23) | 1.57 | (4.67) |
| Sum A | | 18.78 | (100.00) | 42.75 | (100.00) | 33.63 | (100.00) |
| B | $NaBO_2 \cdot H_2O_2$ | 19.00 | (100.00) | 16.25 | (100.00) | 15.28 | (100.00) |
| C | $Na_5P_3O_{10}$ | 59.52 | (100.00) | 39.00 | (100.00) | 48.00 | (100.00) |
| D | Foam inhibitor | 0.20 | (7.41) | ---- | (----) | 0.40 | (12.90) |
| | OA plus 5 EO | ---- | (----) | 2.00 | (100.00) | ---- | (----) |
| | OA plus 10 EO | 2.50 | (92.59) | ---- | (----) | 2.70 | (87.10) |
| Sum D | | 2.70 | (100.00) | 2.00 | (100.00) | 3.10 | (100.00) |
| Total sum | | 100.00 | | 100.00 | | 100.00 | |

| | Component of the washing composition | Example number 28 | | Example number 29 | | Example number 30 | |
|---|---|---|---|---|---|---|---|
| A | Alkanesulfonate | ---- | (----) | ---- | (----) | ---- | (----) |
| | HST-estersulfonate | ---- | (----) | ---- | (----) | ---- | (----) |
| | HT-estersulfonate | ---- | (----) | ---- | (----) | ---- | (----) |
| | Olefinsulfonate | 5.00 | (11.70) | ---- | (----) | ---- | (----) |
| | OA-EO-sulfate | ---- | (----) | 4.00 | (11.87) | ---- | (----) |
| | TA-EO-sulfate | 2.50 | (5.85) | ---- | (----) | 5.00 | (14.72) |
| | KA-EO-sulfate | ---- | (----) | ---- | (----) | ---- | (----) |
| | TA-sulfate | ---- | (----) | ---- | (----) | 1.00 | (2.94) |
| | KA-sulfate | ---- | (----) | 1.80 | (5.34) | 1.00 | (2.94) |
| | Soap B | ---- | (----) | 5.00 | (14.84) | ---- | (----) |
| | Soap C | 7.20 | (16.86) | ---- | (----) | ---- | (----) |
| | Soap G | ---- | (----) | ---- | (----) | 3.00 | (8.83) |
| | Carboxybetaine | ---- | (----) | ---- | (----) | 0.60 | (1.76) |
| | Sulfobetaine | 0.50 | (1.17) | 0.80 | (2.37) | ---- | (----) |
| | CMC | 1.40 | (3.27) | 1.50 | (4.45) | 1.30 | (3.83) |
| | EDTA | 0.40 | (0.93) | ---- | (----) | ---- | (----) |
| | NTA | 8.00 | (18.73) | ---- | (----) | 10.00 | (29.46) |
| | Phosphonate | 7.50 | (17.56) | 5.00 | (14.84) | 7.00 | (20.63) |
| | $Na_2CO_3$ | ---- | (----) | 10.59 | (31.43) | ---- | (----) |
| | Waterglass | 4.20 | (9.83) | 3.50 | (10.38) | 3.70 | (10.90) |
| | $MgSiO_3$ | 3.00 | (7.02) | ---- | (----) | ---- | (----) |
| | $Na_2SO_4$ | 0.23 | (10.53) | 0.31 | (0.92) | 0.35 | (1.03) |
| | Brightener | 1.08 | (2.53) | ---- | (----) | ---- | (----) |
| | Water | 1.72 | (4.02) | 1.20 | (3.56) | 1.00 | (2.94) |
| Sum A | | 42.73 | (100.00) | 33.70 | (100.00) | 33.95 | (100.00) |
| B | $NaBO_2 \cdot H_2O_2$ | 18.20 | (100.00) | 14.30 | (100.00) | 21.80 | (100.00) |
| C | $Na_5P_3O_{10}$ | 35.57 | (100.00) | 47.00 | (100.00) | 40.75 | (100.00) |
| D | Foam inhibitor | ---- | (----) | ---- | (----) | 0.50 | (14.29) |
| | OA plus 5 EO | ---- | (----) | 5.00 | (100.00) | 3.00 | (85.71) |
| | OA plus 10 EO | 3.50 | (100.00) | ---- | (----) | ---- | (----) |
| Sum D | | 3.50 | (100.00) | 5.00 | (100.00) | 3.50 | (100.00) |
| Total sum | | 100.00 | | 100.00 | | 100.00 | |

TABLE II—Continued

| Component of the washing composition | | Example number 31 | | Example number 32 | | Example number 33 | |
|---|---|---|---|---|---|---|---|
| A | ABS | 7.6 | (20.72) | 6.0 | (16.75) | 7.3 | (20.96) |
|   | TA-sulfate | | | 0.5 | (1.39) | | |
|   | KA-sulfate | | | 1.5 | (4.18) | 2.0 | (5.74) |
|   | Soap D | 1.8 | (4.97) | | | 1.2 | (3.44) |
|   | Fs-amide 8 EO | 2.5 | (6.91) | | | | |
|   | TAMB | 9.0 | (24.86) | | | | |
|   | $C_{16-21}$-carboxylic acid | | | 7.5 | (20.94) | | |
|   | Dioctylacetate | | | | | 6.5 | (18.66) |
|   | Dialkylaminopropionate | | | | | | |
|   | Carboxybetaine | | | | | 0.8 | (2.29) |
|   | Sulfobetaine | | | 0.7 | (1.95) | | |
|   | CMC | 0.5 | (1.38) | 2.0 | (5.62) | 1.8 | (5.16) |
|   | EDTA | 0.1 | (0.28) | 0.2 | (0.55) | 0.3 | (0.86) |
|   | Phosphonate | 8.5 | (23.48) | 6.0 | (16.76) | 8.0 | (22.97) |
|   | Waterglass | 2.9 | (8.01) | 6.0 | (16.76) | 4.5 | (12.91) |
|   | $MgSiO_3$ | 1.9 | (2.76) | 2.5 | (6.98) | | |
|   | $Na_2SO_4$ | 0.8 | (2.21) | 0.6 | (1.67) | 0.8 | (2.29) |
|   | Brightener | 0.2 | (0.55) | 0.3 | (0.83) | 0.35 | (1.00) |
|   | Water | 1.4 | (3.87) | 2.0 | (5.62) | 1.3 | (3.72) |
| Sum A | | 36.3 | (100.00) | 35.8 | (100.00) | 34.85 | (100.00) |
| B | $NaBO_2 \cdot H_2O_2$ | 21.3 | (100.00) | 20.80 | (100.00) | 17.55 | (100.00) |
| C | $Na_5P_3O_{10}$ | 42.2 | (100.00) | 39.9 | (100.00) | 44.5 | (100.00) |
| D | Foam inhibitor | 0.2 | (100.00) | 0.50 | (14.29) | 0.60 | (19.35) |
|   | OA plus 10 EO | | | 3.00 | (85.71) | 2.50 | (80.65) |
| Sum D | | 0.2 | (100.00) | 3.50 | (100.00) | 3.10 | (100.00) |
| Total sum | | 100.00 | | 100.00 | | 100.00 | |

| Component of the washing composition | | Example number 34 | | Example number 35 | | Example number 36 | |
|---|---|---|---|---|---|---|---|
| A | Alkanesulfonate | | | 7.5 | (26.67) | | |
|   | HST-estersulfonate | 4.0 | (10.06) | | | | |
|   | OA-EO-sulfate | | | | | 4.0 | (13.74) |
|   | KA-sulfate | 2.3 | (5.78) | 1.7 | (5.58) | 1.8 | (6.18) |
|   | Soap B | | | | | 3.9 | (10.31) |
|   | Soap C | 4.1 | (10.31) | | | | |
|   | $C_{16-21}$-carboxylic acid | 7.0 | (17.62) | | | | |
|   | Dioctylacetate | | | 6.0 | (19.72) | | |
|   | Dialkylaminopropionate | | | | | 8.0 | (27.52) |
|   | Carboxybetaine | | | 0.4 | (1.31) | | |
|   | Sulfobetaine | 0.6 | (1.51) | | | 0.8 | (2.74) |
|   | CMC | 1.9 | (4.78) | 1.2 | (3.94) | 1.5 | (5.15) |
|   | EDTA | 0.2 | (0.50) | 0.5 | (1.64) | | |
|   | NTA | 5.0 | (12.57) | | | | |
|   | Phosphonate | 8.0 | (20.14) | 6.8 | (22.36) | 5.0 | (17.19) |
|   | Waterglass | 4.0 | (10.06) | 3.8 | (12.49) | 3.5 | (12.02) |
|   | $Na_2SO_4$ | 0.4 | (1.01) | 0.7 | (2.30) | 0.3 | (1.03) |
|   | Brightener | 0.4 | (1.01) | 0.3 | (0.99) | | |
|   | Water | 1.85 | (4.65) | 1.52 | (5.00) | 1.2 | (4.12) |
| Sum A | | 39.75 | (100.00) | 30.42 | (100.00) | 29.1 | (100.00) |
| B | $NaBO_2 \cdot H_2O_2$ | 16.25 | (100.00) | 15.28 | (100.00) | 14.30 | (100.00) |
| C | $Na_5P_3O_{10}$ | 42.0 | (100.00) | 51.2 | (100.00) | 51.6 | (100.00) |
| D | Foam inhibitor | | | 0.40 | (12.90) | | |
|   | OA plus EO | 2.0 | (100.00) | | | 5.00 | (100.00) |
|   | OA plus 10 EO | | | 2.70 | (87.10) | | |
| Sum D | | 2.0 | (100.00) | 3.10 | (100.00) | 5.00 | (100.00) |
| Total sum | | 100.00 | | 100.00 | | 100.00 | |

The washing compositions according to the invention may also contain enzymes. If the enzymes are supplied as aqueous concentrates, it is advisable to spray them on salts which are capable binding water of crystallization. In the case of the above examples, the enzyme preparations were sprayed on the further separate powder component C or the anhydrous salts contained therein, tripolyphosphate or soda. If the enzymes are supplied as solid products, however, it is advisable to mix them with one of the powder component A or the further powder component C or with the agglomerate from these two powder components A and C, and to bind them by spraying the non-ionics thereon or to spray a suspension of the solid enzyme preparations in the non-ionics on the further powder component C or a part of the powder component C, and to incorporate this prior mixture in the washing composition.

If enzyme-containing washing compositions are to be made, commercial products are used which, provided solid enzyme concentrates are concerned, are adjusted by the manufacturer by addition of inorganic salts, mostly sodium sulfate, in quantities of 7% to 15% by weight, for example to the following activities:

A protease with 125,000 LVE/g.,
An amylase with 75,000 SKBE/g.,
A lipase with 10,000 IE/g.

In the above-described washing compositions, enzymes or combinations of enzymes may be incorporated in the following amounts:

(I) A washing composition according to one of the Examples 1 to 12 contains 0.3% to 1.5% by weight of protease (375–1875 LVE/g.)

(II) A washing composition according to one of the Examples 1 to 12 contains 1.2% by weight of lipase (120 IE/g.)

(III) A washing composition according to one of the Examples 1 to 12 contains 0.4% by weight of protease (500 LVE/g.)
1.0% by weight of amylase (750 SKBE/g.)

(IV) A washing composition according to one of the Examples 1 to 12 contains 2.0% by weight of amylase (1500 SKBE/g.)

If by the use of solid enzyme concentrates, additional sodium sulfate is introduced into the washing compositions, the amounts of sodium carbonate or tripolyphosphate is correspondingly reduced.

As the brightener, the amount of which may lie within the range of 0.05% to 1.4%, preferably 0.1% to 0.8% by weight of the total washing composition, the following compounds are suitable, depending upon the materials to be brightened:

For cotton: Compound according to Formula I in which $R_1=$ —NH—$C_6H_5$, $R_2=$ —$NC_4H_8O$ (morpholine residue)

For cotton and synthetic fibers: Compound according to Formula I, in which $R_1$ and $R_2=$ —$NHC_6H_5$ For polyamides: Compound according to Formula III, in which $R_7=$ —$SO_2$—$NH_2$, $R_8=$ —Cl For polyamides and polyesters: 2,5-di-(benzoxazolyl-2')-thiophene.

The preceding specific embodiments are illustrative of the practice of the invention. It is to be understood, however, that other expedients known to those skilled in the art or described herein may be employed without departing from the spirit of the invention or the scope of the appended claims.

We claim:

1. A process for the production of a pulverulent to granular, perborate-containing washing composition consisting essentially of
    (a) from 5% to 40% by weight of surface-active compounds selected from the group consisting of anionic surface-active compounds, amphoteric surface-active compounds and nonionic surface-active compounds, with the proviso that at least 50% by weight of said surface-active compounds are said anionic surface-active compounds,
    (b) from 7.5% to 50% by weight of an alkali metal perborate having an average amount of water of crystallization equal to or below that of a compound corresponding to the formula $$MeBO_2 \cdot H_2O_2 \cdot H_2O$$

where Me is an alkali metal
    (c) from 15% to 80% by weight of (i) complex-forming compounds capable of complexing calcium ions selected from the group consisting of (1) non-hydrolysable organic complex-forming compounds selected from the group consisting of phosphonates and polycarboxylates and (2) hydrolysable inorganic complex-forming compounds and (ii) inorganic non-complex-forming builders with the proviso that said inorganic non-complex-forming builders are present in an amount of from 0 to 50% by weight of component (c),
    (d) from 1% to 10% by weight of non-wash-active compounds selected from the group consisting of sodium sulfate, sodium chloride and water, and
    (e) from 0 to 10% by weight of other customary washing composition additives selected from the group consisting of 0 to 8% by weight of non-surface-active foam inhibitors, from 0 to 1.4% by weight of optical brighteners, from 0 to 3% by weight of water-insoluble stabilizers for per-compounds, from 0 to 2% by weight of soil-suspension agents and enzymes selected from the group consisting of amylase, protease and lipase wherein the content of protease is from 0 to 5000 LVE/gm., the content of amylase is from 0 to 5000 SKBE/gm. and the content of lipase is from 0 to 1000 IE/gm., which consists of the steps of drying with heat an aqueous slurry of a component A consisting essentially of (1) said anionic surface-active compounds of (a) above, (2) said non-hydrolysable organic complex-forming compounds of (c) above, present in an amount of from 0 to 60% by weight of component A, (3) not more than 20% by weight of component A of said hydrolysable inorganic complex-forming compounds of (c) above, (4) from 0 to 50% by weight of component A of said inorganic non-complex-forming builders of (c) above, (5) said non-wash-active compounds of (d) above and (6) said optionally-present other customary washing compositions additives of (c) above, selected from the group consisting of optical brighteners, water-insoluble stabilizers for percompounds and soil-suspension agents, to a water content of from 1% to 15% by weight of component A whereby a pulverulent component A is obtained, admixing said pulverulent component A to a pulverulent component B consisting of said perborate component of (b) above and a pulverulent component C consisting of the remainder of said hydrolysable inorganic complex-forming compounds of (c) above and the remainder of said optionally-present inorganic non-complex-forming builders of (c) above, spraying a melt of said optionally-present non-ionic surface-active agents, amphoteric surface-active agents and non-surface-active foam inhibitors on at least one of said pulverulent components A, B or C or said admixture, adding said optionally-present enzymes of (c) above, and recovering said pulverulent to granular, perborate-containing washing composition.

2. The process of claim 1 wherein said non-surface-active foam inhibitors are present in an amount of from 0.5% to 5% by weight of said washing composition and are sprayed on separately.

3. The process of claim 1 wherein said hydrolysable inorganic complex-forming compounds of (c) are present entirely as said component C, which component C is introduced into the drying with heat zone during the drying with heat of said aqueous slurry of said component A so that the not yet or still incompletely dried small drops of the aqueous slurry meet the particles of the said pulverulent component C.

4. The pulverulent to granular, perborate-containing washing composition produced by the process of claim 1.

5. The process of claim 1 wherein said hydrolysable inorganic complex-forming compound is sodium tripolyphosphate.

6. The process of claim 1 wherein said alkali metal perborate is sodium perborate monohydrate.

7. The process of claim 2 wherein said non-surface-active foam inhibitor on the one hand, and said non-ionic and amphoteric surface-active compound on the other hand, are sprayed on separate pulverulent components of the washing composition and the sprayed powders thus obtained, optionally together with further components incorporated in the washing composition, are admixed to give said finished washing compositions.

8. The process of claim 5 wherein said sodium tripolyphosphate is present solely in component C in an amount of from 35% to 59.5% by weight of said washing composition.

References Cited

UNITED STATES PATENTS 3,161,597  12/1964  Young _____ 252—99

MAYER WEINBLATT, Primary Examiner

U.S. Cl. X.R.

8—111; 252—95